United States Patent [19]

Smith

[11] Patent Number: 4,811,215
[45] Date of Patent: Mar. 7, 1989

[54] INSTRUCTION EXECUTION ACCELERATOR FOR A PIPELINED DIGITAL MACHINE WITH VIRTUAL MEMORY

[75] Inventor: Alan J. Smith, Berkeley, Calif.

[73] Assignee: Intergraph Corporation, Huntsville, Ala.

[21] Appl. No.: 941,085

[22] Filed: Dec. 12, 1986

[51] Int. Cl.⁴ .............................................. G06F 9/00
[52] U.S. Cl. .................................................... 364/200
[58] Field of Search ................ 364/200 MS, 900 MS; 365/220 MS, 230 MS; 340/747 MS

[56] References Cited

U.S. PATENT DOCUMENTS

| 4,587,612 | 5/1986 | Fisk | 364/200 |
| 4,675,806 | 6/1987 | Uchida | 364/200 |
| 4,700,291 | 10/1987 | Saito | 364/200 |

Primary Examiner—Gareth D. Shaw
Assistant Examiner—John G. Mills
Attorney, Agent, or Firm—Stephen J. Phillips; Robert C. Colwell; James A. Deland

[57] ABSTRACT

An instruction execution accelerator for a pipelined digital machine with virtual memory. The digital machine includes a pipelined processor which on memory accesses outputs a virtual address to a data cache unit (DCU). On particular memory accesses, such as store or similar operations, the pipelined processor can be advanced or accelerated to the next instruction once the memory access is known not to cause a page fault. The pipeline accelerator includes a small associative memory which the page number of a target address of a store operation is compared. If there is a match, it is know that the target address relates to a page within the real memory and the instruction can complete asynchronously. Otherwise if there is no match, the page address is inserted in the associative memory to become the most recent addition. On the recognition of a page fault by the DCU, the associative memory will be cleared to make room for the new entry and others. The instruction execution accelerator can also be used for load instructions. If an address match is found on a load instruction, then the pipeline can be advanced to the next instruction, and must wait for the completion of the present load instruction only when another instruction attempts to reference the data prior to its being loaded.

30 Claims, 7 Drawing Sheets

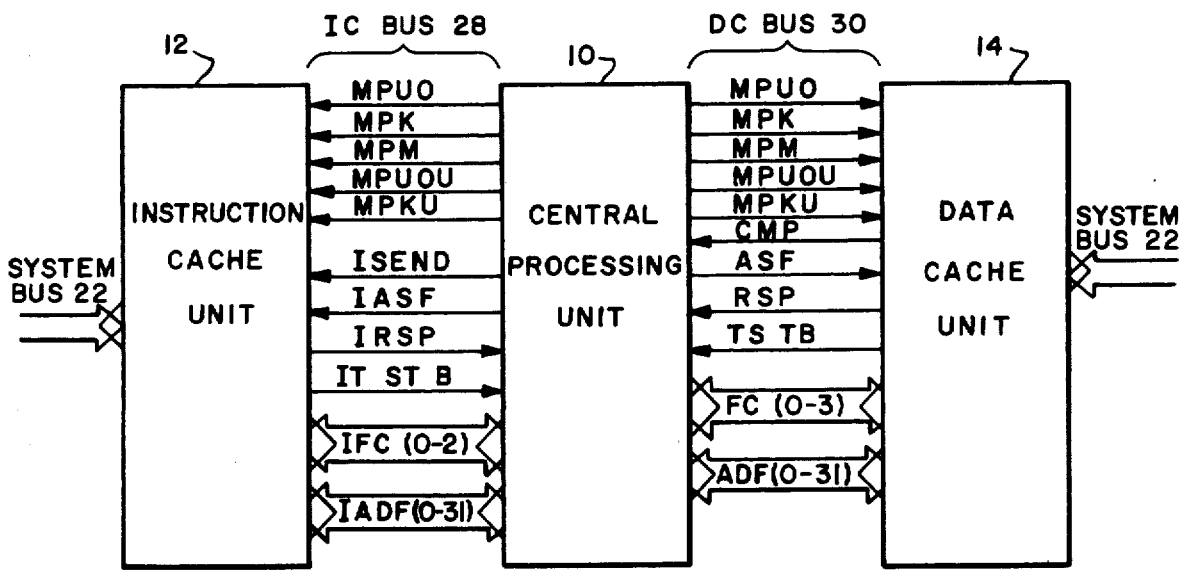

FIG. 2

FUNCTION CODE

```
FC  3 2 1 0
    0 0 0 0   LOAD SINGLE-WORD MODE
    0 0 0 1   LOAD DOUBLE-WORD MODE
    0 0 1 0   LOAD BYTE
    0 0 1 1   LOAD HALF-WORD
    0 1 0 0   TEST AND SET
    1 X 0 0   STORE SINGLE WORD
    1 X 1 0   STORE DOUBLE WORD
    1 X 1 0   STORE BYTE
    1 X 1 1   STORE HALF-WORD
```

FIG. 3

TRAP CODE

```
FC  3 2 1 0
    X 0 0 0
    X 0 0 1   MEMORY ERROR (MSBE)
    X 0 1 0   MEMORY ERROR (MDBE)
    X 0 1 1
    X 1 0 0
    X 1 0 1   PAGE FAULT
    X 1 1 0   PROTECTION FAULT (READ)
    X 1 1 1   PROTECTION FAULT (WRITE)
```

FIG. 4

TRAP CODE

```
IFC 3 2 1 0
    X 0 0 0
    X 0 0 1   MEMORY ERROR (MSBE)
    X 0 1 0   MEMORY ERROR (MDBE)
    X 0 1 1
    X 1 0 0
    X 1 0 1   PAGE FAULT
    X 1 1 0   PROTECTION FAULT
    X 1 1 1
```

FIG. 5

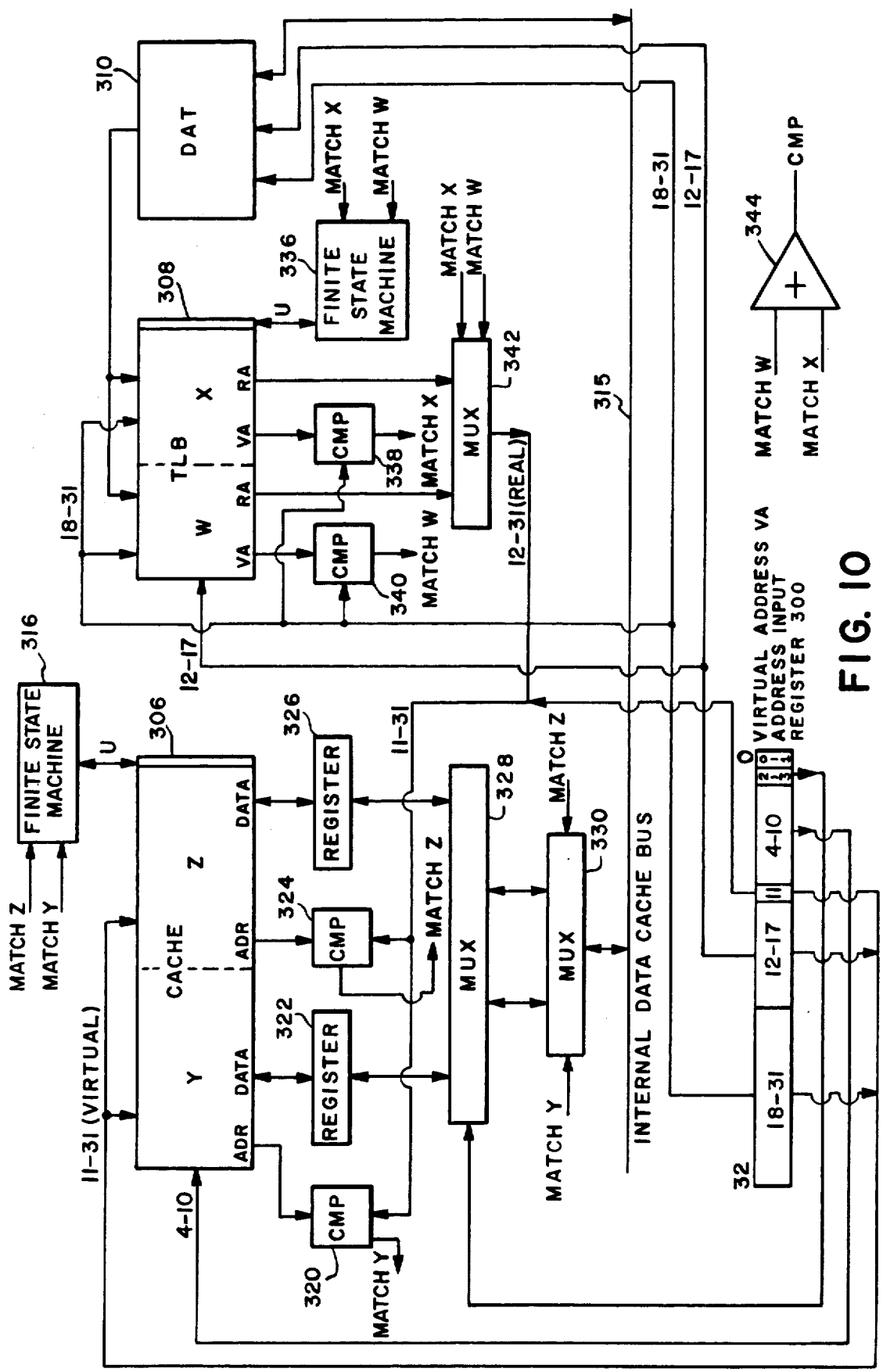

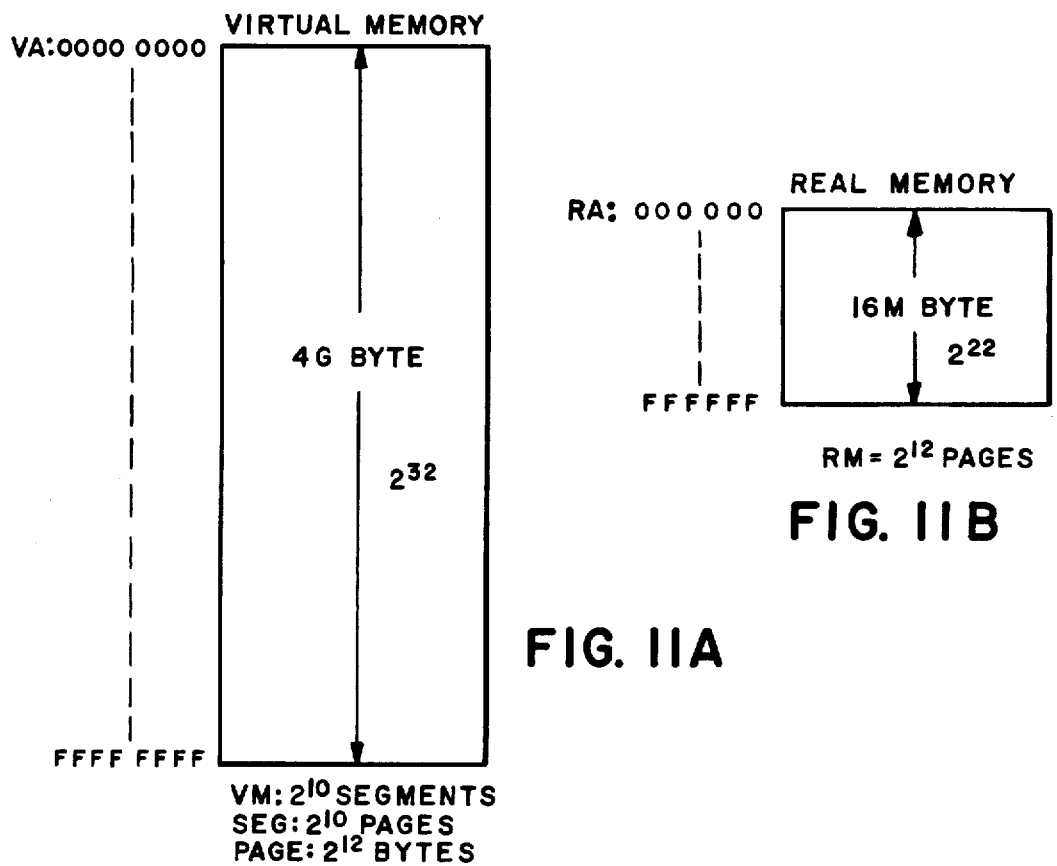
FIG. 11B
FIG. 11A
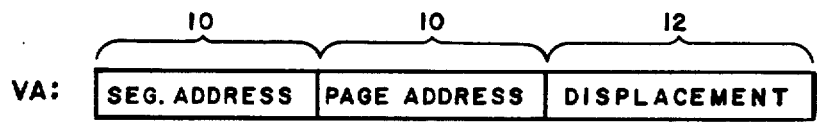
FIG. 11C

INSTRUCTION EXECUTION ACCELERATOR FOR A PIPELINED DIGITAL MACHINE WITH VIRTUAL MEMORY

The invention pertains generally to instruction and data management techniques for high performance digital machines and is more particularly directed to the management of data storage and instruction execution in pipelined digital machines with virtual memory.

A digital machine is an electronic system including a digital processor or computer which can be programmed to accomplish many tasks. Digital machine architectures can be grouped into two general categories that are termed sequential and pipelined. In a sequential machine each instruction is fetched during a memory cycle in a predetermined order or sequence and completely executed by a central processing unit (CPU) before the next instruction is fetched. The predetermined order of the instruction execution is maintained by a program counter which addresses the memory location where the next instruction to be executed is stored. The sequence of the execution is determined by a program stored in the memory of the machine.

While historically the architecture of choice because a sequential machine can be implemented cheaply and easily, this architecture is somewhat limited in performance. Every fetch-execute cycle in the program sequence is governed by a timing signal or clock, and the only way to increase the number of instructions executed is to increase the clock rate. However, the clock rate can only be increased to the point where the hardware devices forming the machine are unable to operate any faster, and, thus, this architecture is hardware limited.

Because of this inherent limitation, the pipelined architecture has been gaining popularity. In a pipelined architecture, a single processor can commence executing one or more instructions before the execution of a previous instruction has been fully completed. An instruction execution pipeline comprises a series of hardware stages where a portion or particular operation of an instruction is executed while the other stages execute portions of other instructions in parallel therewith. The architecture contemplates that an instruction of a program may be either fully or partially executed out of the normal sequence as long as it is not waiting for the results from the completion of a previously executed instruction and is not simultaneously asking for the same resources as another instruction in the pipeline. One particular type of instruction for which it is highly desirable to form a pipeline structure, is a memory access instruction. A memory access instruction is an operation where data are loaded (read) from memory or data are stored (written) into memory. Data in this context means either instructions or operational data used by a program.

Memory access instructions in some machines are very slow in execution relative to the speed of execution of other instructions and add considerable time to program execution if the machine must wait until after each memory access completion to execute additional instructions. This is particularly the case where a machine incorporates a virtual memory system where a determination must be made whether a virtual address can be translated into a real address prior to the actual memory access. A "real address" refers to the location in main memory where the data addressed are actually resident.

A page fault occurs when there is no valid mapping of a virtual to a real address, i.e., the location addressed is not in main memory means, and thus has no real address. When a page fault occurs, it usually means that the data are actually on a disk or other secondary storage device and (a) data must be removed from main memory to make room for the requested data, (b) the requested data must be fetched and loaded into main memory, (c) the translation table must be updated to show the new and correct virtual to real address translation, and (d) the instruction must be reexecuted.

In the case of a read instruction, subsequent instructions, because they may depend on the data being read, must wait until the memory has been accessed. However, the only result of a store instruction is to update the memory. Therefore, the only subsequent instructions that depend on such are those that read the same memory location. However, because in most pipelined machines, memory accesses are processed sequentially, the correct results are obtained automatically. (If memory references may be processed out of order, then explicit synchronization must be introduced.) There need be no explicit synchronization between a store instruction and a subsequent read instruction to the same memory location. Generally, it would appear in a digital machine with a pipelined processor that a store instruction can be issued and subsequent instructions can be processed while the actual store proceeds asynchronously. This would allow continued instruction processing through the pipeline, which would increase operational speed.

A normal virtual memory machine, however, cannot be operated in such a manner. If the processor is using a virtual address, the target address of the store operation must be translated to a real address before the store operation can be completed. In a virtual memory system, there is always the possibility that a requested memory access is temporarily impossible because the target virtual address location is on a page which is not resident in real memory. Thus, a store instruction may provoke a page fault from the real memory. A page fault is a signal indicating that the particular page addressed is nonresident in real memory. A page fault is handled by a supervisory routine by a trap or interrupt process which causes the state of the processor to be saved and control to be transferred to the supervisory routine. If instructions subsequent to a store instruction are permitted to execute before the page fault is cleared, then an inconsistent processor state can result. A consistent processor state is one in which all instructions prior to that indicated by the program counter have completed, and all instructions at and subsequent to that point have not yet started execution. If the state is not consistent, it is inconsistent. It is considerably harder to restart execution from an inconsistent state.

The processor state may be inconsistent because the register file and/or main memory can be modified by instructions subsequent to the interrupting instruction. However, the interrupting instruction itself will not have been totally completed until after the page fault is cleared, and the state of memory upon recovery could be inconsistent. If the processor state saved is not consistent with that for subsequent instructions, restarting the processor at the correct point after the virtual store operation has been completed will be considerably more difficult. The restart of the instruction following the store may not be possible without significant increases in cost and complexity of the processor.

Therefore, it would be highly advantageous to determine quickly whether a store or similar instruction will cause a page fault and to allow the processing of subsequent instructions if such is not the case or to halt execution of following instructions until a successful virtual to real address translation has been accomplished. This determination should be made with the minimum amount of hardware and at the earliest possible time after a store instruction is identified. This would increase the advantage of pipelining instructions in a virtual memory machine without unduly increasing the cost and complexity of the processor.

SUMMARY OF THE INVENTION

The invention provides an instruction execution accelerator for a high performance digital machine with a pipelined processor and a virtual memory. The pipeline accelerator in response to the decoding of predetermined operational sequences of the machine, i.e., store or similar instructions, or parcels thereof, determines whether they can be marked as complete without further processor intervention and without causing an inconsistent state for the processor. If the determination is affirmatively made, then the instruction is treated as complete and allowed to pass through and exit the pipeline while another instruction is inserted into the pipeline of the processor by the pipeline control logic. This permits the pipeline control logic to advance the instruction pipeline past the particular operation in response to such determination without waiting for its normal completion, and thus obtain improved processor performance by the more rapid and frequent completion of instructions.

The invention is advantageously implemented in the illustrated embodiment for a memory access instruction of the store or write type in a digital machine which includes virtual memory. In prior systems, the pipeline of such a processor would not be permitted to proceed until the virtual address of a store instruction had been translated successfully into a real address. Because the possibility of a page fault occurring existed on every store operation, all store operations, even those instructions where the operation could have completed asynchronously, were delayed until this possibility was eliminated. The pipeline accelerator in one preferred embodiment determines at an early point in the instruction execution whether a store operation can be completed successfully without a page fault. If such is the case, the pipeline accelerator generates an accelerate issue signal to the pipeline control logic which will permit the instruction stream to advance without further delay. Thus, the store operation with its virtual to real address translation can occur asynchronously with the processor pipeline operation but in parallel therewith.

Accordingly, the pipeline accelerator includes means for determining whether the virtual memory address of a store instruction will result in a page fault. The determining means includes a small associative memory of N entries where each entry is the virtual address of some page currently resident in real memory. These entries are compared quickly with the page number of the virtual target address of the store instruction. The lower order bits of the virtual address need not be included because they specify a byte within a page and all bytes of a resident page are by definition also resident.

An associative memory is preferably used because an indication of a match with the memory can be made quickly, thereby providing the pipeline control logic with an immediate indication that the operation can complete without further processor intervention. The number of entries N can range from 1 to an arbitrarily large number, for example, the number of pages which can be resident in the real memory at one time. The same pages of the address space of a memory are repeatedly referenced over short periods of time, generally during execution of the portion of the program on the pages. Therefore, an associative memory with a small number of entries, or even one entry, can be expected to match a large fraction of the target addresses for store operations.

Although the invention will be described with respect to an associative memory, it is evident that other comparison mechanisms may be used. Any comparison mechanism which is faster than the time to wait for the address translation to complete for an instruction is sufficient. For a small number of entries, an associative search would be the most advantageous implementation. For a larger number of entries, the implementation of the determining means could be associative, set associative, direct mapped, or hashed. A sequential search might also be feasible if it can be made fast enough.

The pipeline accelerator controls the determining means with a pipeline accelerator control which is enabled by an accelerate request signal from the instruction decoding circuitry of the processor indicating that the real memory will be accessed with the calculated target address of a store operation. The accelerate request signal is generated just after the target address has been calculated, and the store operation is detected to permit the pipeline accelerator to make its determination very early in the store execution instruction cycle. When enabled by the acceleration request, the accelerator control causes the page number of the virtual target address to be compared associatively and simultaneously with all the entries of the associative memory. A match indicates that the store operation will not cause a page fault because the page is resident in the real memory. Subsequent instructions are permitted to issue or advance down the pipeline by treating the store operation as complete with an accelerate issue signal.

When the page number of the target address does not match an entry in the associative memory, the accelerator control causes the page number of the virtual address to be loaded into the associative memory as a new entry. I there is no match, then (a) the requested page is resident in real memory and not marked in the associative store, or (b) the page is not resident in real memory. In the latter case, an attempt to perform the virtual to real address translation will cause a page fault, a trap to the supervisor, and a page fetch operation. Execution will resume at this instruction after the page fault is processed. In any event, the memory access will eventually complete (after a page fault, if necessary), and at that time, the new virtual page number is entered in the associate store replacing, if necessary, some previous entry. The accelerator control is reset upon a determination that the instruction has completed normally to await another acceleration request signal.

The accelerator control also receives a purge signal from the supervisor to cause a clearing of the entries of the associative memory. This is generally because a page fault signal indicates that a nonresident page will replace a page now resident in real memory which could cause one of the entries of the associative memory to be invalid. However, it is also important to note that the supervisor must purge the associative memory whenever it changes an entry in any page table. This can occur at times other than upon a page fault. Because the implementation for the associative memory includes a small number of entries, clearing the memory on purge signals will not have a significant impact on the pipeline accelerator performance. If the associative memory is made larger, then more complex page address replacement algorithms can be used.

The pipeline accelerator in the implementation shown determines extremely quickly and with a minimum number of operational elements whether an instruction execution pipeline can be accelerated for store instructions. Because of the small number of elements, the pipeline accelerator can be integrated into most central processing unit (CPU) single chip processors as part of a pipeline control with minimal extra cost while providing a significant improvement in instruction processing capability. Advantageously, the pipeline accelerator will be manufactured on a CPU chip with the same integrated circuit technology as that used to implement the processor itself and will be integral therewith.

These and other objects, features, and aspects of the invention may be better understood by referring to the following detailed description when taken in conjunction with the accompanying drawings wherein:

BRIEF DESCRIPTION OF THE DRAWINGS

FIG. 2 is a detailed block diagram of the interface buses between the central processing unit, the data cache unit and the instruction cache unit, respectively, which are illustrated in FIG. 1;

FIGS. 3-5 are tabular representations of the coding of bit combinations for the FC and IFC buses illustrated in FIG. 2;

FIG. 10 is a detailed block diagram of the data cache illustrated in FIG. 1 showing the addressing thereof; and FIGS. 11A-C are a pictorial representation of the virtual memory addressing scheme of the digital machine illustrated in FIG. 1.

DETAILED DESCRIPTION OF THE PREFERRED EMBODIMENT

Figure 1:
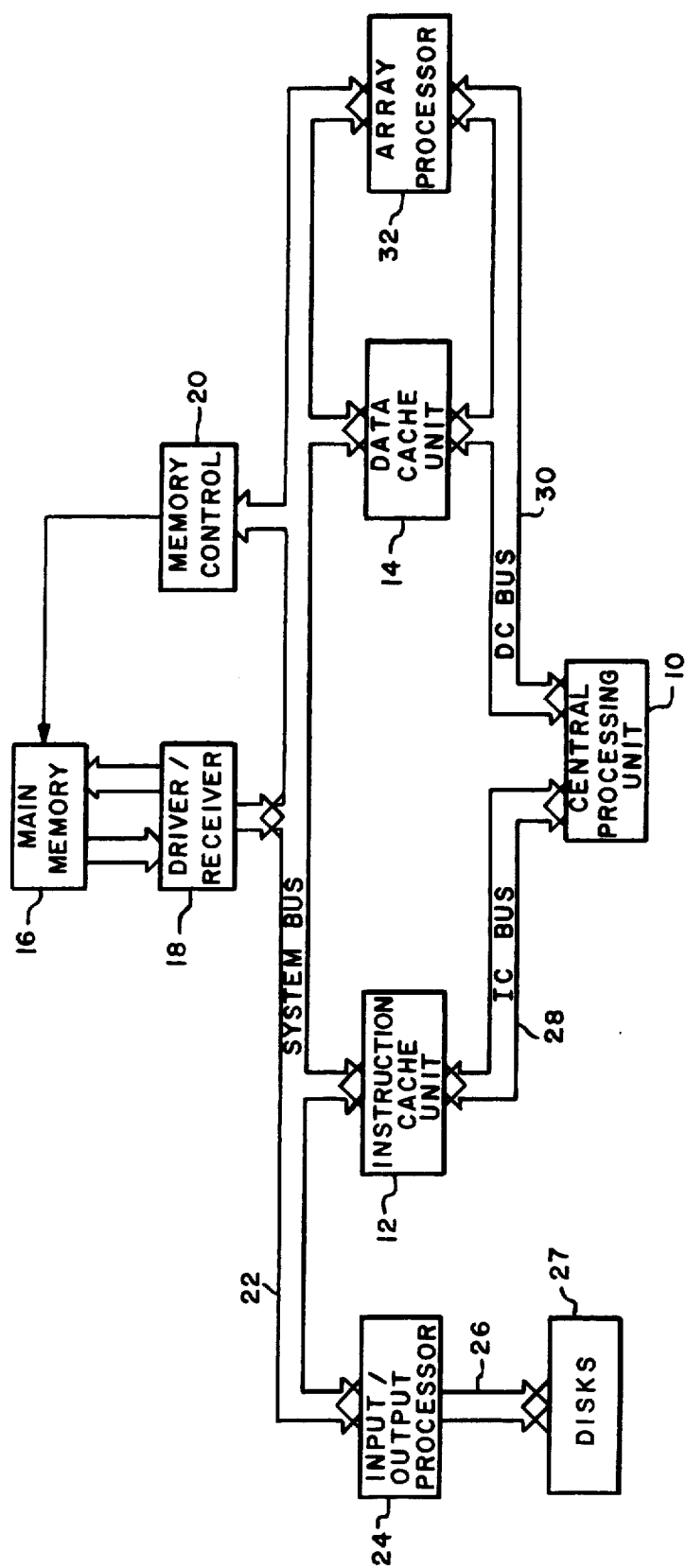
FIG. 1 is a detailed block diagram of a digital machine and a virtual memory, the digital machine having a pipelined central processing unit including a pipeline accelerator constructed in accordance with the invention.

Referring now to the drawings and in particular FIG. 1, there is shown a block diagram of a digital machine with a virtual memory. The digital machine has a pipeline processor including a pipeline accelerator, constructed in accordance with the invention. The digital machine comprises a central processing unit (CPU) 10 which fetches the instructions of a program from a memory and executes them in a pipelined manner. In operation, the fetching of an instruction will cause a machine process to be initiated to determine the next instruction in the program sequence. The execution of the fetched instruction may require a memory access including either reading data from a memory or storing data to a memory. To provide rapid access to instructions or data, the digital machine has a memory architecture including an instruction cache unit (ICU) 12, a data cache unit (DCU) 14, a main memory 16, and one or more secondary storage devices (such as disks) 27.

The main memory 16 is the primary storage device for the system and may be comprised of dynamic RAM, static RAM, ROM, or other medium to high speed read/write memory. The instruction cache unit 12 and the data cache unit 14 provide very high speed real memory which the central processing unit 10 may access through two independent cache buses 28 and 30. In general, the CPU 10 fetches instructions from the very high speed memory of the ICU 12 over the instruction cache bus 28. In executing an instruction, the CPU 10 loads data from or stores data to the very high speed memory of the data cache unit 14 by means of the data cache bus 30. The CPU 10 processes the instructions of a program in a parallel manner by using the ICU 12 to fetch instructions while simultaneously accessing the DCU 14 for data.

Instructions or data which are not found in the very high speed memories are accessed through a system bus 22 from main memory 16 via driver/receiver circuits 18. This process is under the control of a main memory control 20 and system bus interface circuits of the ICU 12 and DCU 14. The memory control 20 additionally may perform an error correcting function and act as an arbiter for the system bus 22.

Additionally, other system elements can be coupled to the system bus 22, such as an input/output processor unit 24. The input/output processor unit 24 may connect the system bus 22 to an I/O bus 26 which provides a standard bus interface to peripheral devices, such as a VME bus, for support of hard disk drives, floppy disk drives, printers, monitors, etc. Further, it is possible to attach an array processor 32 between the data cache bus 30 and the system bus 22. This independent processor can be designed to perform integer or floating point operations of a certain type at a high rate of speed. The array processor 32 may be used for special programmed functions which require high speed calculations with many operations.

The digital machine operates under the regulation of a supervisory program. The supervisory program is used to run the application programs of one or more users and allocates user space of the main memory 16. The main memory 16 and the system bus 22 are relatively slow compared to the ICU 12 and the IC bus 28 or the DCU 14 and the DC bus 30. With the high speed cache memories DCU 14 and ICU 12, widely accepted empirical observation shows that most instruction fetches and memory accesses are to these cache devices. Only when instructions or data are nonresident in these cache memories is there a data transfer between the main memory 16 and caches 12 or 14. This structure advantageously provides a memory architecture which increases the rate at which programs can be processed.

The address space of the machine (range of virtual addresses) is partitioned into equal size blocks called pages. For implementation convenience, pages are always a power of 2 bytes in length. Main memory is partitioned into equal size blocks called page frames which hold exactly one page. A page table is used to take a virtual address and map it to a real address of main memory 16.

Since all mapping is in page size blocks, it is sufficient to take the high order bits of the virtual address, i.e., the page number and via the page table, to obtain the real address of the first word of the page, i.e., the page address. A referenced location is that obtained by adding the low order bits of the virtual address to the real address of the page. In this system, the main memory will be termed real memory, as all data and instructions are transferred from it to the CPU 10 through caches 12 and 14. The virtual memory of the system is an imaginary memory space as large as the addressing capability of the system, in the illustrated embodiment 32-bits or $2^{32}$ locations of a byte size. Therefore, the virtual address of the machine can access a space much larger than the real memory.

For a memory access, it is determined whether the information sought is found in the real (main) memory 16. If the particular page requested is resident, then an address translation is available in the page table to determine where in the real memory the page is present, i.e., the virtual address is translated into a real address. If the requested page is not resident in real memory, a page fault results, indicating the page must be brought into real memory. After the new page is found, some page is removed from the real memory in concert with a replacement algorithm and the new page takes its place. The new page is then resident and capable of being accessed through a virtual to real address translation.

FIG. 2 will now be more fully explained and shows a detailed implementation of the IC bus 28 and the DC bus 30 which connect the central processing unit 10 to the instruction cache unit 12 and the data cache unit 14, respectively. The DC bus 30 comprises a bidirectional address/data bus ADF(0–31) providing a multiplexed address/data bus of 32-bits. Generally, on store or write operations to the data cache unit 14 the CPU 10 supplies a 32-bit address on bus ADF followed by the data word to be stored. Conversely, on load or read operations from the data cache unit 14, the CPU 10 supplies an address on the lines ADF and reads a data word from the addressed location of the unit over the same lines. The DC bus 30 further includes a 4-bit function code/-trap code bus FC (0–3) which allows control and status information to be transferred between the CPU 10 and the data cache unit 14. Control data from the CPU 10 over the bus FC relates to the type of data transfer that the CPU is commanding.

FIG. 3 illustrates the combinations of the function code bits and their requested operation from the CPU 10. The DCU 14 replies with a trap code which indicates the type of trap or interrupt which the data cache unit 14 needs the CPU 10 to handle. This code is generated for interrupt operations which accompany a trap strobe signal TSTB. The trap codes for the FC bus are more fully shown in FIG. 4. In this respect a page fault which indicates that a virtual memory address cannot be translated causes a routine of the supervisor to fetch the page from virtual memory 27 and transfer it into real memory. The memory access is then retried.

An address strobe signal ASF is activated by the CPU 10 to indicate that the address and type of data transfer information are valid on the buses ADF and FC, respectively. Another signal RSP is generated on load operations by the data cache unit 14 to indicate that data are ready on the bus ADF. On store operations the signal RSP is generated when the data cache unit 14 is ready to accept the data.

In addition to these control and data lines, the interface between the central processing unit 10 and the data cache unit 14 also includes 5-bits of a system status word labelled signals MPUO, MPK, MPUOU, MPKU, and MPM, respectively. These signals are bits 26–30 of the 32-bit system status word (SSW) stored in a system status register of the CPU 10. These signals indicate the operational state of the central processing unit 10 and the system supervisor to the data cache unit 14. The signal MPUO indicates to the data cache unit 14 whether the system is in supervisor or user mode. The signal MPK indicates whether the protect key for not allowing the program to access certain areas of memory is enabled or disabled. The signal MPM indicates to the data cache unit 14 whether the address supplied on bus ADF is a virtual address or a real address. The signal MPUOU indicates whether the user data space is to be protected during supervisory mode. The signal MPKU is to enable a protect key for user space when in supervisory mode. These signals are available to the DCU 14 on every memory access and are updated when the CPU 10 changes the SSW.

In operation, and when using virtual memory, the CPU 10 performs a memory access by providing a 32-bit virtual address on the bus ADF, the type of data transfer desired on the bus FC, and then generates the address strobe ASF to indicate the validity of the information. The data cache unit 14 receives this information in response to the address strobe ASF and determines whether a load or a store is desired by decoding bit 3 of bus FC. If the operation desired is a load, then the signal RSP is activated to indicate when data are ready on the bus ADF, or if a store operation, the signal RSP is activated to tell the CPU 10 when the DCU 14 is ready to accept the data. On a load double operation, the signal RSP is sent back along with each data parcel transfer. On store double operations only one signal RSP is sent back after the second data parcel is accepted. If these load and store operations are abnormally terminated or a page fault results, then the trap strobe TSTB is generated along with the trap code on the bus FC for the CPU 10 to read. The trap strobe TSTB will cause the CPU unit 10 to enter supervisory mode to handle the interrupt.

In a similar manner, the IC bus 28 comprises an address/instruction bus IADF (0–31) of 32-bits which provides a multiplexed bus for address and instruction transfer between the CPU 10 and the ICU 12. In general, the CPU 10 generates addresses on the bus IADF and the ICU 12 returns instructions on the same lines. The IC bus 28 also comprises a 3-bit function code bus IFC (0–2) which allows the instruction cache unit 12 to supply a trap code similar to that supplied by the data cache unit 14.

The trap code of the instruction cache unit 12 is more fully illustrated at FIG. 5. As with the data cache unit 14, the instruction cache unit 12 responds with a trap code indicating a page fault if the next instruction necessary for the execution of the program is not found within the real memory 16. The instruction trap strobe signal ITSTB is generated by the ICU 12 to indicate that a trap or interrupt operation should be processed by the CPU 10 in supervisory mode. The type of trap is indicated in the trap code on the bus IFC. The instruction cache unit 12 also generates an instruction response signal IRSP to indicate to the CPU 10 that an instruction is ready and is generated synchronously with the placing of the instruction on the bus IADF. An instruction send signal ISEND indicates to the ICU 12 that the CPU 10 is ready to receive the next instruction and the pipeline control has emptied the instruction buffer. System status word bits comprising signals MPUO, MPK, MPM, MPUOU, and MPKU are supplied to the instruction cache unit 12 to provide an indication of system status from the central processing unit 10. The bits of the SSW are available at all times to the instruction cache unit 12 and are changed when the central processing unit 10 updates the system status word.

The central processing unit 10 generates an instruction address on the bus IADF at the same time that it generates a signal ISAF indicating that the address can be strobed into the instruction cache unit 12. The instruction is obtained from the high speed memory of the cache 12, and the ICU 12 signals its availability by the signal IRSP. If the instruction is nonresident in the memory 16 or another error exists, the ICU will reply with an instruction trap strobe signal ITSTB which causes the supervisory mode to be entered and the error to be handled or a page to be transferred from auxiliary memory. When the pipeline of the CPU 10 is ready to accept the next instruction, the ISEND signal is generated to load the instruction buffer with the fetched instruction, and the next instruction address is generated.

Figure 6:
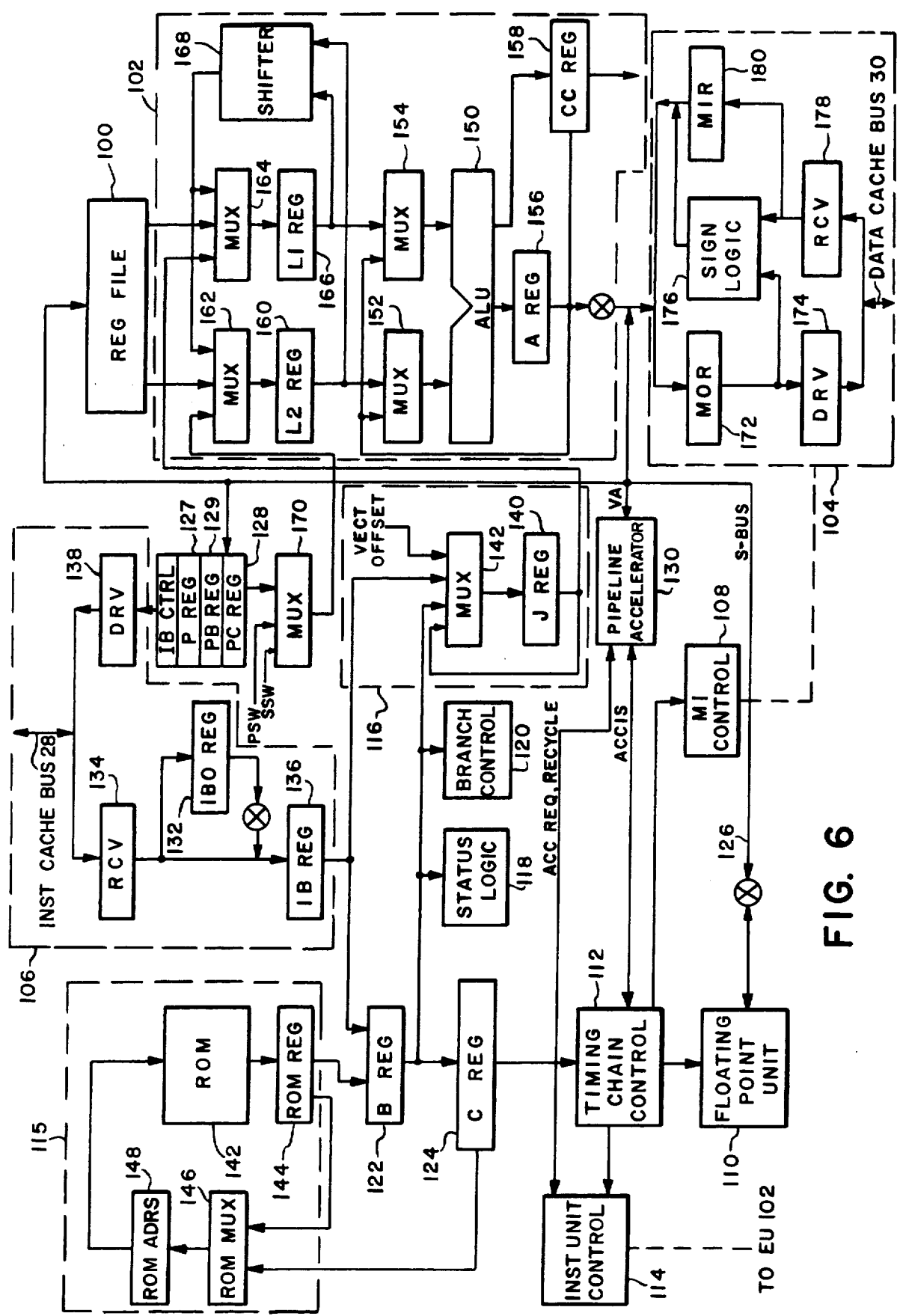
FIG. 6 is a detailed block diagram of the data paths and control circuitry comprising the central processing unit illustrated in FIG. 1.

FIG. 6 shows a more detailed block diagram of the central processing unit 10 and its pipeline and control structure for executing instructions. The basic configuration of the processor 10 includes a register file 100, an instruction execution unit 102, a data cache bus interface 104, an instruction cache bus interface 106, a memory interface control 108, a floating point unit 110, a timing chain control 112, an instruction unit control 114, a macro instruction generator 115, an address operand unit 116, a status logic unit 118, a branch control 120, a decoding register B and logic 122, an instruction issue register C and logic 124, a program counter register unit 128, and a pipeline accelerator unit 130. A CPU system or S bus 126 connects the major elements together to facilitate data and instruction transfer between elements.

The instruction cache interface 106 will now be more fully explained wherein instructions input over the IC bus 28 and through receiver circuitry 134 are loaded into an IBO register 132 which is 32-bits wide. Generally, the digital machine processes instructions in 16-bit parcels, and an instruction can be anywhere from one to four parcels in length depending on its memory addressing mode. The particular instruction parcel which is ready to be operated on is loaded into an instruction buffer (IB) register 136 at the beginning of the pipeline. If the IBO register 132 is empty, the first parcel may be passed directly from the receiver circuitry 134 to the instruction buffer register 136 without passing through an extra stage.

The addresses of the memory from which these instructions are loaded are placed on the IC bus 28 via driver circuits 138. These addresses, from which the instructions are to be fetched, are determined by the contents of the program counter register 128. The contents of the program counter register 128 are generally advanced by one as each parcel successfully enters the pipeline at the B register 122. Thus, a generally sequential program execution is maintained unless alternate or branch sequencing is needed. The program counter 128 can be loaded with a new address to change the sequence on an instruction branch, interrupt, reset, or exception trap but otherwise the contents of the program counter are advanced sequentially. Instruction addresses corresponding to the instructions in the IB register 136, the B register 122 and the C register 124 appear in registers P 127, PB 129 and PC 128, respectively; register PC is also known as the program counter. The value for the program counter is stored on the program stack if a context switch or procedure call occurs.

The contents of the instruction buffer register 136 may also be loaded directly into a J register 140 of the address operand unit 116 through a multiplexer 142. The J register is a holding register for parts of the instruction which are operands or used in an address calculation for operands of different areas of the processor circuitry. The B register 122 holds the instruction parcel while decoding circuitry, including the status logic 118 and the branch control logic 120, determine the operation the processor should execute from bits in the operation code field and other fields of the parcel.

The branch control logic 120 recognizes the successful decoding of a branch instruction and will cause a target address to be calculated and loaded into the program counter register 128 to divert the sequential operation to the new starting point. In general, the branch control logic 120 tests the condition codes of previously executed instructions from the instruction execution unit 102 and generates decisions based upon the results of the decoding of these codes. Further, the contents of certain fields of the B register 122 can be made accessible to the J register 140 through the multiplexer 142. The contents of these fields and other parcels from the instruction buffer register 136 or a vector offset can be used in address calculations by the execution unit 102. Thus, depending upon the addressing mode of the particular instruction being executed, address computations may be performed by this means and the execution unit 102.

In general, however, the contents of the B register 122 are decoded and then loaded in their decoded form into the C register 124. The C register 124 is used as a holding register for the issuance of instructions to the timing chain control 112. Pipeline conflicts are determined by comparing an instruction request for a resource against a table of resources busy during its decoding in the B register 122. Release logic makes this comparison while the instruction is being decoded, and instructions are issued from the C register 124 when no conflict exists. After it is issued, the instruction will be completed regardless of any event that may follow. Therefore, an instruction must be completely assembled in the C register 124 before that instruction is issued.

The instruction issue causes the invocation of either the macro-instruction generator 115 or the timing chain control 112. If the macro-instruction generator 115 is invoked, a ROM sequence is called which inserts instructions into the instruction pipeline from a ROM 142 through a ROM register 144. These instructions are inserted one instruction at a time until the particular ROM sequence or subroutine which was invoked is completed. The ROM sequence uses the ROM register 144 and a ROM multiplexer 146 to determine the next ROM address of the sequence which is loaded into a ROM address register 148. Addresses issuing from the ROM address register 148 cause the ROM 142 to output the next instruction in the macro-sequence to the ROM register 144. The instruction is then loaded into the B register 122 where it enters the pipeline and is executed similarly to any other instruction. The macro-instruction generator provides three types of macro-instructions. There are specialized instructions that support the operating or supervisory system (booting, diagnostics, interrupt and trap handling, context switching support, etc.) and certain operations required by the floating point standard not directly implemented in the floating point unit 110. Further, the macro-sequences handle other complex instructions (string move, character propagate) characteristic of complex instruction set architectures.

A normal instruction, however, is issued to the timing chain control 112 which provides enabling and timing information to one of three controls to execute the instruction. The timing chain control 112 either invokes an instruction unit control 114 which operates on the instruction with execution unit 102 or invokes the floating point unit 110 to perform a floating point operation on one or more operands, or controls the memory interface control 108 to load or store predetermined information.

If the instruction unit control 114 is invoked, then the execution unit 102 executes a particular operation on the instructions. The main part of the instruction execution means 102 is an arithmetic logic unit (ALU) 150. The arithmetic logic unit 150 has inputs for two operands and provides the result of a logic operation which is loaded into an accumulator or A register 156. The basic operations which can be performed by the ALU 150 are add, subtract, and bit-wise logical AND/OR and EXCLUSIVE OR. The data on which the ALU 150 operates are obtained through a multiplexing control including multiplexers 152 and 154 from latch registers (L2 and L1) 160 and 166, respectively. The ALU 150 can combine or operate on the outputs of the L registers 160 or 166 or the other input to multiplexers 152 and 154, which is the output of the A register 156.

This is a bypass mechanism which allows one of the operands of the ALU 150 to be the output of a previous operation. As indicated the output from the A register 156 may be fed back to either leg of the ALU 150 through multiplexers 152 and 154. In general the inputs to the L registers which feed the ALU 150 are from outputs of the register file 100 through multiplexers 162 and 164. The operands which have been previously stored in the register file 100 are loaded into the L registers 160, 166 and then into the ALU 150 to perform the commanded operation. The result of such operation is then loaded into the A register 156 to determine the result. From this result, the A register output can be stored back into the register file 100, the registers of FPU 110, or the memory, via the system or S bus 126.

The multiplexers 162, 164 have two other inputs with which to load the latch registers 160, 166. The first input is from the output of a shifter 168 which takes the data stored in the registers 160 and 166 and under control of the instruction unit control 114 performs shifting operations of a particular nature before loading the contents back into the registers 160 and 166 through the multiplexer inputs. These operations are for field positioning, character manipulation, binary division/multiplication, etc.

Another input to multiplexer 162 is from the output of a multiplexer 170 which gives the digital machine the option of inputting the contents of the program counter 128, the program status word PSW, or the system status word SSW. In this manner the machine may recalculate an address through the instruction execution unit 102 or change the program status word or system status word with masks. A third input to the multiplexer 164 is from the J register 140. The J register 140, as previously described, contains its own output, the contents of the B register 122, a parcel from the instruction buffer register 136, or a vector offset. In this manner, address calculations using the J register contents as one operand can be performed in the instruction execution unit 102.

The data cache bus interface 104 comprises the circuitry necessary to make memory reference accesses to the data cache unit 14 under the control of the memory interface control 108. Receiver circuits 178 are used for inputting data to a memory input register 180 which buffers the information between the data cache bus 30 and the CPU system bus 126 of the processor 10. Sign logic 176 decodes the received data and applies a sign bit to the incoming data for internal error checking. Likewise, data on the S bus 126 can be output to the data cache bus 30 and thereafter, either to the data cache unit 14 or the main memory 16 by transmitting it from a memory output register 172 by means of driver circuits 174. Similarly, the logic circuit 176 strips the sign bit off the data going to the driver circuit 174 before they are transmitted on the data cache bus 30.

The memory interface control 108 handles data traffic between the data cache unit 14 and the memory input register 180 and memory output register 172 for the CPU 10. The memory interface control 108, therefore, controls the loading (reading) and storing (writing) of the data cache unit 14 or real memory and is assisted in this operation by the pipeline accelerator 130. The pipeline accelerator 130, which is connected to the S bus 126 and has an output to the timing chain control 112 and inputs from the instruction unit control 114 acts on memory reference accesses to accelerate the pipeline when the result will not affect subsequent instructions. In general, the pipeline accelerator 130 accomplishes this by obtaining from the timing chain control 112 an indication of an instruction parcel which needs no further delay and thereafter generating an accelerate issue signal ACCIS. The accelerate issue signal ACCIS is received by the timing chain control 112 to indicate that the instruction will complete successfully and thus, is allowed to issue. Once the instruction has issued, the next parcel will be loaded into the pipeline at the B register 122 and all other instructions in the pipeline allowed to advance to the next stage.

The architecture illustrated provides a pipeline having six stages or separate operational functions which can be accomplished on instructions in parallel. The first stage is address generation where the instruction to be executed is identified and its address loaded into the program counter register 128. The second stage occurs when the instruction is read into the IB register 136 during a fetch operation of the instruction unit control 114. The third stage is when the instruction is loaded into the B register 122 and decoded. After decoding, the next stage is entered through the C register 124 by issuing the instruction to the timing chain control 112. The fourth stage of the pipeline, which is executed in response to the issuance of an instruction, reads the register file 100 to fetch any operands needed for the execution of an instruction. Execution is the next and fifth step in the pipeline where, depending upon the type of instruction, either the execution unit 102 performs a calculation, the FPU 110 performs a calculation, or the memory interface control 108 performs a memory access. The result of the execution stage may then be used to update the register file 100, the FPU 110, or the memory in the last step of the pipeline.

The stages of the pipeline allow many more instructions to be executed than if the processor delayed to fetch another instruction until after a previous instruction had progressed through every step of the pipeline. The instructions are thus executed in parallel where one instruction is being fetched while another is being decoded, another is being issued, another is accessing the registers, another is accessing the memory, etc. When the instruction in the last or update stage has completed, the pipeline advances and another instruction is inserted at the beginning of the pipeline while the others move to the next stage. The preferred implementation of the invention herein described concerns itself with the update stage, particularly for memory accesses, and pertains to accelerating the completion signal for a memory access of the store type to allow the pipeline to continue to execute while a store operation is completing asynchronously. Normally, the completion signal for a store operation is the response from the DCU 14 that the data can be transferred, i.e. the virtual address has been translated successfully into a real address.

Figure 7:
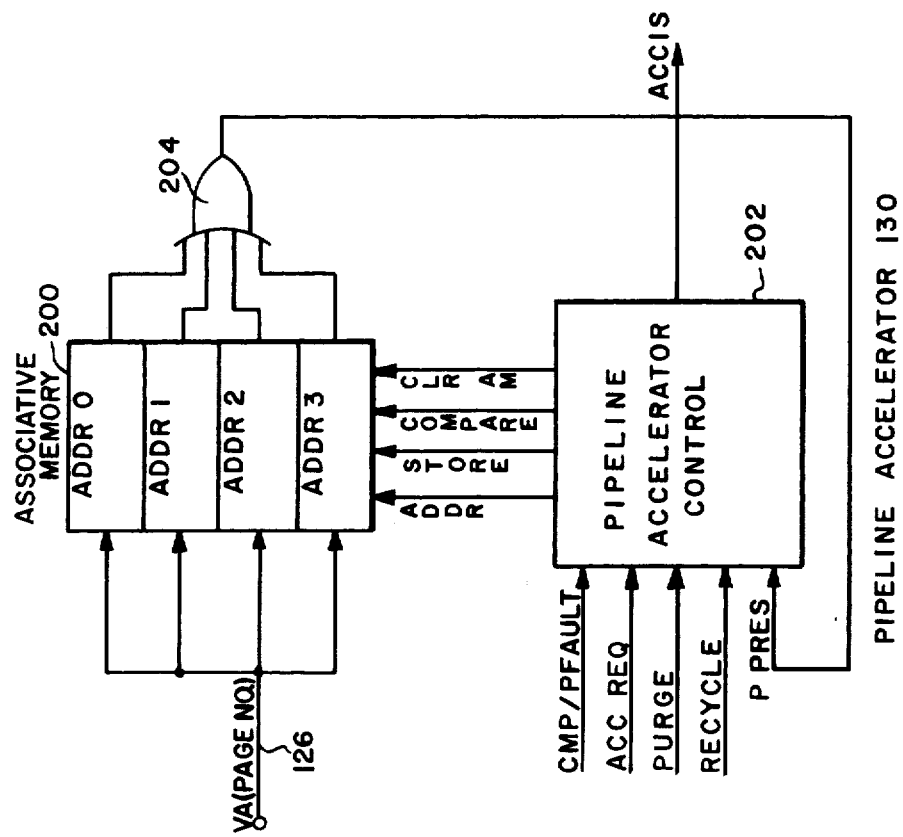
FIG. 7 is a more detailed diagram of the pipeline accelerator illustrated in FIG. 6.

FIG. 7 is a block diagram of the pipeline accelerator means 130. The pipeline accelerator means comprises an associative memory 200 and a corresponding pipeline accelerator control 202. The pipeline accelerator control 202 controls the associative memory 200 to compare the page number of a virtual address VA from the S bus 126 with the contents of a small number of memory locations ADDR0–ADDR3. The associative memory 200 by being only four locations in length can store enough information to provide substantial acceleration of the pipeline on store operations without creating excessive hardware overhead. The pipeline accelerator control 202 requests the comparison via a signal COMPARE. The result of the associative comparison of each cell is output on individual lines to an OR gate 204. If the page number of the virtual address VA matches any entry of the associative memory 200, the OR gate 204 will generate a page present signal PPRES. The pipeline accelerator control 202 may also through signals ADDR and STORE, store the page number of the virtual address VA presently on the S bus 126 into one of the locations of the associative memory 200. The address of the particular location is set on the signal lines ADDR and the signal STORE indicates that the page information on the S bus 126 should be written to the particular location. Further, at predetermined times the pipeline accelerator control 202 may clear the associative memory 200 by means of the signal CLRAM.

The pipeline accelerator control 202 further receives a match signal CMP from the data cache unit 14 indicating that the virtual page address has been successfully translated into a real address. Otherwise, the pipeline accelerator control 202 receives a page fault signal PFAULT from the data cache 14 indicating that the virtual address translation could not be completed and that the supervisor must load the missing page into the main memory 16. Further, the pipeline accelerator control 202 receives the two signals ACC REQ and RECYCLE from the timing chain control 112 to indicate the beginning of an accelerate cycle and to reset the device, respectively.

In operation, the pipeline accelerator control 202 is reset with each RECYCLE signal to begin the start of an accelerate sequence every time an instruction issues from the C register 124. With the control 202 initialized, it waits for an ACC REQ signal indicating that the pipeline decoding circuitry has detected a memory access of the store type and calculated a virtual target address for the store. The ACC REQ signal is generated at the same time that the target address is transferred to the data cache unit 14 on the S bus 126. In response to the ACC REQ signal, the pipeline accelerator control 202 issues a compare signal COMPARE to cause the associative comparison of the page number bits from the virtual address VA with the contents of each location of the associative memory 200. If the comparison is successful, the store instruction will complete without a page fault and, therefore, the pipeline accelerator control 202 issues a accelerate issue signal ACCIS which causes the pipeline to advance. At the same time that the ACCIS signal is generated, the pipeline accelerator control resets the replacement status of the addresses ADDR0–ADDR3 of the associative memory 200.

However, there are two other alternatives when the page present signal PPRES is not generated in response to the compare signal. The other alternatives are that the page is not resident in the main memory 16, which will eventually cause a miss to be returned to the processor 10, or that the page is resident in the main memory 16 but is not marked in the associative memory 200.

Therefore, in response to an accelerate request signal ACC REQ which does not result in a page present response, the pipeline accelerator control 202 replaces one of the locations ADDR0–ADDR3 in the associative memory 200 with the page number of the present virtual address VA on the S bus 126. In this manner, the entries which are present in the data cache unit 14 but are not marked as page numbers in the associative memory 200 may be replaced on an ongoing basis as they are accessed. The replacement is accomplished with respect to a replacement algorithm which can be any of a number of known sequences. We assume here for the sake of simplicity the first (earliest entered) address written of the associative memory 200 will be replaced with the present page number of the virtual address VA on the S bus 126. This FIFO replacement algorithm can be implemented by a counter which sequences through the addresses of the associative memory 200 and then wraps around to the beginning address. The counter generates the ADDR0-ADDR3 addresses and points to the location whose contents are to be replaced and is incremented after each replacement.

Thereafter, if the data cache unit 14 responds to the processor 10 with a compare signal CMP indicating a successful virtual to real translation, the pipeline accelerator control 202 will generate the accelerate issue signal ACCIS. If, however, there is no valid virtual to real translation, the signal CMP will not be generated, and the processor will trap to the routine which handles memory accesses of the main memory 16 in response to the page fault signal PFAULT. (The PFAULT signal is decoded from the trap codes shown in FIG. 4) The signal PFAULT indicates that a new page will be written into the main memory 16 and, therefore, one or more page entries in the associative memory 200 may become invalid. Therefore, in response to a purge signal PURGE, the pipeline accelerator control 202 will issue the clear associative memory signal CLRAM to completely initialize the associative memory 200. The purge signal PURGE is generated from the supervisor as will be more fully explained hereinafter. Thereafter, the store instruction will complete normally and cause the next instruction to advance after the storage has taken place. As the next instruction issues, the issue logic will also generate the recycle signal to reset the pipeline accelerator control 202 for the next request.

Figure 8:
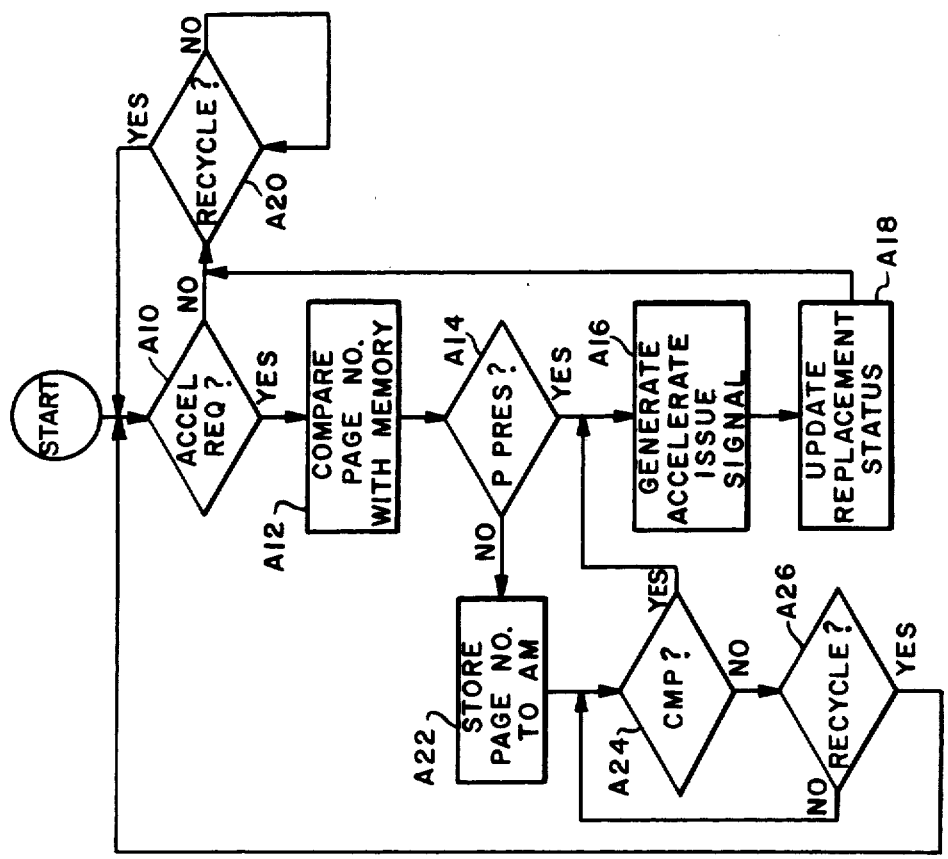
FIG. 8 is an operational flow chart of the sequence performed by the pipeline accelerator illustrated in FIG. 7.

This operation of the pipeline accelerator is more fully shown in flow chart form in FIG. 8. In function block A10 the accelerator control 202 begins the sequence of operations by testing whether there is an ACC REQ signal, and if not, checks if there is a RECYCLE signal present in block A20. The presence of a recycle signal will send the sequence back to the test in block A10, while the absence of a RECYCLE signal will cause the sequence to form a loop and continually test for an issuance of an instruction. When the RECYCLE signal has finally been generated and an acceleration request signal is issued in block A10, the operation will advance to block A12 where the accelerator control 202 will cause the page number of the virtual address VA to be compared with the contents of the associative memory 200.

The operation sequence will next test for the page present signal PPRES in block A14 and depending upon the results of the test, either branch to block A22 or to block A16. If the PPRES signal is indicated, then in block A16 the accelerator control 202 will issue the accelerate issue signal ACCIS to the timing chain control 112. If the PPRES signal is not detected in block A14, then the page number of the virtual address is stored according to the replacement algorithm in block A22. While a FIFO replacement algorithm is shown, it should be evident that the least recently used, random, or clock replacement algorithm, or other well known replacement algorithms, can be used.

Thereafter, the accelerator control 202 will enter a loop which consists of the test for the CMP signal in block A24 and the RECYCLE signal in block A26. Depending upon which occurs first, the program will either branch to block A16 or back to the start of the operational sequence at block A10. If the CMP signal occurs first, an affirmative branch from block A24 will cause the program to generate the accelerate issue signal ACCIS from block A16. The operational sequence will then continue to the recycle loop in block A20. However, if the CMP signal does not occur prior to the RECYCLE signal in block A26, then a direct path to the beginning of the operational sequence of block A10 is taken. This occurs when the entry or target address of the store is not found in the data cache unit 14 and a page fault causes the clearing of associative memory 200. The purge signal PURGE clears the associative memory 200 asynchronously of the other parts of the accelerator control circuit 202. If the associative memory is designed to be larger, for example, a size large enough to contain all page references of real memory, then the update operation can be more complex, as by replacing the page address which is deleted from the real memory.

The supervisor when it detects a page fault signal will generate the PURGE signal to clear the associative memory 200. The purge is not done automatically because of the page fault but explicitly because the supervisor changes an entry in the page table. All other supervisory changes in any page table cause a purge. Further, the associative memory 200 is purged whenever the address space changes such as when the register pointing to the base of the segment table is reloaded, or the user switches between user and supervisor state.

The supervisor additionally will purge the associative memory whenever there is a change in protection modes (otherwise the entries would have to include protection mode bits). Instead of a full purge, the supervisor can delete just the entry which has changed in response to the conditions.

Figure 9:
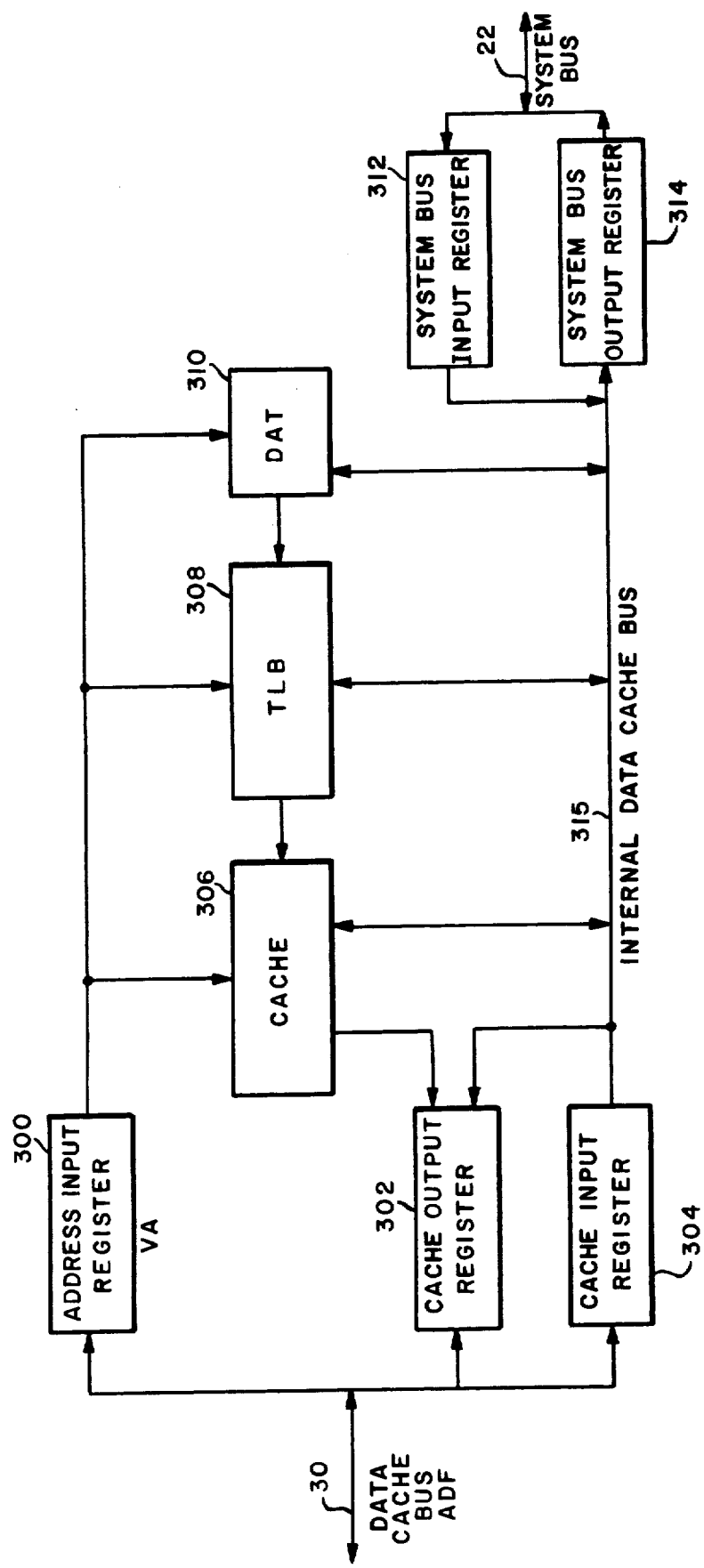
FIG. 9 is a structural block diagram of the data cache illustrated in FIG. 1 showing the data paths thereof.

The operation of the data cache unit 14 for a memory access instruction, specifically a store to memory, will now be more fully disclosed with reference to FIGS. 9–11. The data cache bus lines ADF contain the virtual target address for the memory in the form of 32-bits. The signals on the FC bus specify that this information is an address and that the operation is a store to memory. When the address valid strobe is generated, the data cache unit 14 is notified to begin the memory access or store operation. The virtual address VA is loaded into an address input register 300 of the memory management unit of the data cache unit 14 from the DC bus 30. After the virtual address VA is loaded into the address input register 300, the data to be stored are placed on the data cache bus 30 by the CPU 10, the FC bus specifies that the information is data, and the ADF signal is generated to indicate the data to be stored is now valid. These operations cause the information on the ADF bus to be loaded into a cache input register 304.

The data in the cache input register 304 can be transferred directly to a cache memory 306 over an internal bus 315 when the target location is resident therein. The data can also be written into a system bus output register 314 via the bus 315 for transfer to the main memory 16 from the cache memory 306 or the cache input register 304. These paths are used depending on whether the main memory 16 is updated through a "copy back" or "write through" feature. With "copy back", the cache or real memory 306 is updated, and then the updated locations are copied back to main memory 16 via the bus 315 and register 314 when the contents of those locations are displaced from the cache memory. When using "write through", main memory is updated immediately; the cache memory is updated only if the contents of the locations being updated are already resident in the cache. Loading a word works oppositely. If the contents of the location referenced are in the cache, those contents are copied into a cache output register 302. If the contents are not cache resident, the block containing those locations is first fetched from main memory 16 into a system bus input register 312, and then via the bus 315 the data are copied both into the cache 306 and the cache output register 302. The cache memory 306 is accessed by CPU 10 through the cache output register 302.

Addressing is handled by applying portions of the virtual address VA to the cache memory 306, to a translation look aside buffer (TLB) 308, and to a dynamic address translator (DAT) 310. The TLB 308 and the DAT 310 further can obtain address data from the main memory 16 via the bus 315 and the system bus registers 312, 314. The virtual address VA as shown in FIGS. 11A–C is 32-bits long, thereby forming a virtual space of $2^{32}$ bytes of addresses 0000 0000-FFFF FFFF (hexadecimal). The virtual address consists of 12 bits (4K) of byte address within each page address. There are 20 bits of page numbers indicating a virtual memory space of $2^{20}$ pages, although the invention will be suitable regardless of the number of bits in the real and virtual addresses. The virtual memory is further divided into $2^{10}$ segments, although the invention will be suitable regardless of the number of bits in the real and virtual addresses. The virtual address VA, therefore, specifies a particular byte in the memory space and is a byte address. For our example of page size of 4K bytes, the low order 12 bits are the same for real and virtual addresses.

FIG. 10 will now be more fully explained to illustrate the internal formatting of the cache memory 306, the translation lookaside buffer 308, and the dynamic address translator 310. The virtual address bits 12-17 are used to select one set from the TLB 308 which is formatted as two way set associative. The TLB 308 is divided into two set entries W and X. The virtual address tags of the two TLB entries resident in the set addressed by bits 12-17 are read out into comparators 338 and 340, where the virtual address tag part of the TLB entry is compared with bits 18-31 of the virtual address. The comparators 338 and 340, respectively, generate signals match W and match X, one of which is high if a match is found. One, but not both, of the tags may match, and these signals are used to generate control of a multiplexer 342. If one of the tags match, the multiplexer 342 selects the real address tag of the corresponding TLB entry and supplies that real address to comparators 320 and 324. If there is no match, the dynamic address translator 310 is used to make the address translation.

If either match X or match W indicates a match, then the translation is known to be successful and the possibility of a page fault has been eliminated. At this point, the store instruction can be considered by the processor 10 to have been completed successfully, and the pipeline control logic may be advanced beyond the store instruction. The indication that there is an address tag match is the signal CMP which is returned to the CPU 10, to be used as an input to the accelerator control 30. The signal CMP is generated as the logical OR of signals match W and match X, as shown, using an OR gate 344.

The specifics of the implementation of the DAT 310 are not essential to the understanding of the subject invention, and it is described but briefly here. If the comparison in the TLB 308 fails (neither match W nor match X is true), then the virtual address bits 12-31 are read into the DAT 310, which is the dynamic address translation mechanism. This mechanism maintains the base of the page directory in an internal base segment register. The high order portion of the virtual address, bits 22-31, is added to the base of the page directory to give the word address (for byte address, multiply by 4) of an entry for the page of the page table containing the needed translation. The contents of that address are fetched from main memory 16, and the middle portion of the virtual address, bits 12-21, is added to it, to give a word address for the page table entry for the referenced page. That page table entry is then fetched from the main memory 16, and contains the real address of the page corresponding to the virtual page address residing in the address input register 300. The pair (virtual address, real address) are loaded into an entry in the TLB 308. The entry in the TLB chosen is in the set specified by bits 12-17 of the virtual address, and is the least recently used entry (LRU entry) of the two in that set, as determined by the usage bit U for that set. After the TLB entry is loaded, processing of the store operation resumes as described previously.

If the operation of the DAT 310 fails because there is no entry in the base segment register, no valid entry for the page of the page table, or no valid entry for the address of the page, then a trap signal is returned to the CPU 10 indicating that the translation failed. A failed translation is called a page fault. That signal causes a trap in the CPU 10 and a shift to supervisor state. Such a trap requires that the store operation be aborted, that the state of the CPU be saved, and that the state saved show the store instruction and subsequent instructions as unstarted and show the instruction preceding the store instruction as completed. This implies that the CPU 10 must wait for a successful completion of the address translation for the store before making any irrevocable changes in the machine state (e.g., writing into a register) as a result of instruction following the store. The supervisor will then cause a page fetch (and replacement, if necessary) such that the translation may take place correctly, and the real address will finally be read out of the multiplexer 342. Thus, either by the TLB 308 or the dynamic address translator 310 (and perhaps after a page fault), the cache memory 306 will receive the real address tags from the multiplexer 342. As the real address tags are input to the comparators 320 and 324, the address tags for each of the two lines in the cache memory 306 selected by virtual address bits 12-17 are read into the comparators 320 and 324. The usage bit U for the pair of lines is read into a finite state machine 316.

Concurrently with the loading of the address tags into the comparators 320 and 324, the data of the corresponding lines are read into registers 322 and 326, and then into a multiplexer 328. The comparators 320 and 324, respectively, generate signals match Y and match Z by matching the output of the multiplexer 342 (which is a real address tag from one TLB entry) and bit 11 of the virtual address with the address tags from the two cache lines in the set. Bits 2-3 of the address specify a word within the line selected, and are used to address the word within each of the two possible target lines that have been read into the multiplexer 328. Those two words are then gated out into a multiplexer 330.

For a store operation, the data word is gated from the cache input register 304 into the multiplexer 330 and then is gated through the multiplexer 328 to both the register 322 and the register 326, where it overwrites the word specified by bits 2-3 of its memory address. Then the contents of either register 322 or 326, as appropriate, is written back into the appropriate cache memory line, if match Y is high, then register 322, if match Z, then register 326. The finite state machine 316, depending on the values of match Y and match Z, determines the value of the usage bit, U, and writes it back to the cache with the line. U, if high, specifies that the line in the Y side was the more recently used; and if low, specifies that the line in the Z side of the cache was the more recently used.

If neither the comparator 320 nor the comparator 324 indicates a successful match, then the target line is not in the cache memory 306. In that case, the real address from the TLB 308, concatenated with the bits 4-11 from the virtual address specifying the line within a page, is placed in the system bus output register 314 via the bus 315. The main memory 16 then returns the addressed 16 byte line (four words), one 32-bit word at a time. Those words appear in the system bus input register 312, and from there are written into one of registers 322 and 326 via multiplexers 328, 330. If that entry has been modified ("dirty") since being last written to the main memory 16, then it must be written to main memory for an update (see next paragraph). When all four words have been written into register 322 or 326, the contents of the appropriate register are copied into the selected cache entry. The appropriate entry is the least recently used member of the set selected by bits 4–10 of the virtual address. Concurrently with the write into the cache 306 of register 322 or 326, the corresponding address tag field is also written to the cache memory 306.

If neither comparator 320 nor comparator 324 indicates a successful match, and if the least recently used of those two entries is marked "dirty", then the contents of that entry must be written to main memory before a new line is loaded. A line (four words) is "dirty" if it has been modified since the last time it was recopied to the main memory 16. The main memory 16 is then out of date. In that case, the real address of the dirty line which is to be replaced is the concatenation of the real address tag from that line with the line within the page address bits 4–10 of the virtual address. That address is placed on the bus 315 and then into the system bus output register 314. The main memory is informed that this is an address. Immediately after the address is placed on the system bus 22, one word at a time from the entry to be replaced is gated from the register 322 or 326 (as appropriate) via multiplexers 328, 330 and then to the system bus 22. After all four words have been written to main memory, the line that has just been written is marked as "clean", i.e., not dirty.

While a preferred embodiment of the invention has been illustrated, it will be obvious to those skilled in the art that various modifications and changes may be made thereto without departing from the spirit and scope of the invention as defined in the appended claims. For example, the implementation illustrated stores information to memory using only the aforementioned store instruction. However, other well known digital machines have instructions which perform a computation and then immediately store the result in memory. Thus, the invention is meant to include both the case of a register to memory store as implemented herein and the case of the store of the result of an operation.

Moreover, in special instances the invention can be used for LOAD instructions. If an instruction loads a register but that register is not referenced for K further instructions, the pipeline should not have to wait for the load to complete until the Kth instruction after the LOAD is reached. In this implementation the accelerate request signal is issued by the decoding logic for both a STORE instruction and a register LOAD instruction. Further, the register being loaded is flagged with an operand due to arrive flag, which is reset when the load actually takes place, by the instruction unit control 114. An attempt to read a register with that flag set causes the pipeline to halt until the load completes and the flag is reset. Otherwise, the instruction execution accelerator will advance the pipeline if the location loaded from will not cause a page fault. As previously shown, this will eliminate the possibility of an inconsistent processor state if a page fault occurs on the loading of the register.

What is claimed is:

1. A pipelined digital machine for the high speed processing of instructions of a programmed sequence stored in a memory, said digital machine comprising:
   means for fetching instructions of the programmed sequence from the memory;
   means, coupled to the fetching means, for decoding instructions into operational commands;
   means, coupled to the decoding means, for issuing instructions generating said operational commands in a timed sequence;
   means for executing instructions by operating on said operational commands in response to their issue from said issuing means, and indicating to said issuing means that said operational commands have been executed;
   said fetching means transferring a previously fetched instruction to said decoding means in response to an indication from said decoding means that the operational commands of a previously decoded instruction have been transferred to said issuing means;
   said fetching means further fetching another instruction the memory after transferring said previously fetched instruction to said decoding means;
   said decoding means transferring said operational commands of said previously decoded instruction to said issuing means in response to an indication from said issuing means that said operational commands of a previously issued instruction have been transferred to said executing means, and indicating to said fetching means the said previously decoded instruction has been so transferred;
   said issuing means issuing said operational commands of a previously decoded instruction in response to an indication from said executing means that said operational commands of said previously issued instruction have been executed, and indicating to said decoding means that said pipelined commands of a previously issued instruction have been so transferred;
   means, coupled to the determining means and to the issuing means, for determining whether or not at least one portion of the execution of said operational commands of said previously issued instruction can occur asynchronously to the execution of said operational commands of said previously decoded instruction waiting to issue; and
   means, coupled to the determining means and to the issuing means, for accelerating the execution of the programmed sequence in advance of said indication from said executing means that said operational commands of said previously issued instruction have been executed by causing said issuing means to issue said operational commands of said previously decoded instruction in response to an affirmative determination by said determining means and by causing said issuing means to delay issuing said operational commands of said previously decoded instruction until the complete execution of said operational commands of said previously issued instruction in response to a negative determination by said determining means.

2. A pipelined digital machine as set forth in claim 1 wherein said means for executing includes:
   means for accessing the memory to load data therefrom or to store data thereto.

3. A pipelined digital machine as set forth in claim 2 wherein:
   the memory is a virtual memory, with a real portion which can be accessed relatively quickly and a secondary portion which can be accessed relatively slowly, said virtual memory using an address translation method whereby if a page of the address space is referenced which is not resident in said real portion, then said secondary portion is accessed to replace a page in said real portion with said referenced page from said secondary portion.

4. A pipelined digital machine as set forth in claim 3 wherein:
said virtual memory issues a page fault signal to indicate that said referenced page is not resident in said real portion of memory.

5. A pipelined digital machine as set forth in claim 4 wherein:
said access means calculates a virtual address with which to access said virtual memory; and
said accelerating means determines whether to accelerate the execution of the programmed sequence by examining said virtual address, said accelerating means causing said previously decoded instruction to issue in response to a determination that the addressed virtual location is resident in the real portion of memory.

6. A pipelined digital machine as set forth in claim 5 wherein said accelerating means comprises:
an associative memory with N entries, where N is an integer greater than zero and less than or equal to the number of pages resident in the real portion of memory, said entries corresponding to page numbers of said virtual address which are resident in said real portion of memory.

7. A pipelined digital machine as set forth in claim 6 wherein said accelerating means comprises:
means for associatively comparing the page number of the virtual address of a memory access to said N entries of said associative memory, and for generating an accelerate issue signal if a match is present.

8. A pipelined digital machine as set forth in claim 7 wherein:
said issuing means issues said operational commands of a previously decoded instruction in response to said accelerate issue signal.

9. A pipelined digital machine as set forth in claim 7 which further includes:
means for replacing one of the N entries of said associative memory with an entry corresponding to the page number of the virtual address of a memory access if said means for comparing does not produce a match.

10. A pipelined digital machine as set forth in claim 9 wherein:
said entry is replaced utilizing a first in-first out replacement algorithm.

11. A pipelined digital machine as set forth in claim 7 which further includes:
means for clearing all the entries of said associative memory in response to a page fault signal.

12. A computer system having a pipelined central processing unit integrated circuit chip (CPU) for sequentially executing a number of instructions in parallel with an instruction pipeline under regulation of a pipeline control, the CPU interfacing with an instruction cache unit integrated circuit chip (ICU) through a first bus and with a data cache unit integrated circuit chip (DCU) through a second bus, and the ICU and DCU interfacing with a main memory via a system bus, said computer system further including:
means for detecting the occurrence of a prescribed event which ordinarily indicates that an instruction should issue from the instruction pipeline to the CPU;
means, responsive to said detecting means, for issuing an instruction from the instruction pipeline to the CPU when the prescribed event is detected;
means for determining when at least a portion of a subsequent instruction can execute asynchronously to the current instruction in the instruction pipeline; and
a pipeline acceleration circuit integrated into the CPU and coupled to the determining means and to the issuing means for causing the issuance of an instruction in the instruction pipeline before the prescribed event for those conditions where at least a portion of a subsequent instruction can execute asynchronously to the current instruction in the instruction pipeline.

13. A computer system as defined in claim 12 wherein:
said pipeline accelerator circuit accelerates the issuance of an instruction in the instruction pipeline for a memory access to the DCU of the store type.

14. A computer system as defined in claim 12 wherein said ICU, DCU, and main memory form a virtual memory architecture where programs are segmented into pages and memory accesses to the DCU will cause a page fault signal to be generated if the page of the target address is non-resident in the main memory, and wherein:
said pipeline accelerator circuit accelerates the issuance of an instruction in the instruction pipeline for a memory access to the DCU of a store type upon determining that the page of the target address is resident in the main memory by eliminating the possibility of a page fault signal.

15. A computer system as defined in claim 14 wherein said pipeline accelerator circuit comprises:
an associative memory of N locations where N is an integer greater than zero and less than or equal to the number of pages resident in the main memory.

16. A computer system as defined in claim 15 wherein:
each entry of said associative memory is Y-bits in length, where Y is equal to the number of page bits in a virtual address used to access said main memory.

17. A computer system as defined in claim 16 wherein said DCU includes:
means for translating said virtual address into a real address; and
means for generating a page fault signal if said real address is not resident in said main memory.

18. A computer system as defined in claim 17 wherein said means for translating further includes:
means for generating a match signal indicating that the page number of a virtual address can be translated into a real address resident in said main memory.

19. A computer system as defined in claim 18 wherein:
said pipeline accelerator circuit accelerates the issuance of an instruction in response to the match of a page number of said virtual address with an entry in said associative memory or the receipt of said match signal from said DCU, loads the page number of said virtual address into said associative memory in response to no match of said virtual address with an entry in said associative memory, and clears all entries in said associative memory in response to said page fault signal.

20. A microprocessor based computer system comprising:

primary memory means for selectively storing and outputting digital information from an addressable high speed memory;

a high speed system bus coupled to the primary memory means for communicating digital information between means coupled to said system bus;

instruction cache means, coupled to said system bus, for managing the selective retrieval of instructions from said primary memory, and for selectively storing said instructions therefrom in a mapped addressable very high speed memory for providing selective very high speed output of said instructions from said high speed memory;

data cache means, coupled to said system bus, for managing the selective storage and retrieval of data to and from said primary memory, and for selectively storing and outputting said data at very high speed to and from a mapped addressable very high speed memory;

a very high speed instruction bus coupled to said instruction cache means for communicating said very high speed instruction output from said instruction cache via said instruction bus;

a very high speed data bus coupled to said data cache means for communicating data at said very high speed to and from said data cache means via said data bus; and microprocessor means, independently coupled to each of said instruction bus and said data bus, for selectively processing data received from said data cache means in response to instructions received from said instruction cache means, said microprocessor means including a pipelined processor section where said instructions are executed in parallel and a pipeline accelerator for issuing instructions in advance of the time when said instructions normally issue in response to a determination that data is being stored to a location in said very high speed memory of said data cache means.

21. A microprocessor based computer system as set forth in claim 20 where:

said primary memory means generates a page fault signal to said microprocessor means to indicate that data to be stored or retrieved is not resident in said main memory means.

22. A microprocessor based computer system as set forth in claim 21 wherein said pipeline accelerator includes:

means for determining whether the memory access of said primary memory means will cause said page fault signal.

23. A microprocessor based computer system as set forth in claim 22 wherein said determining means includes:

a secondary memory having at least one entry whose contents indicates the presence or absence of a selected block of information in said primary memory means; and memory control means, receiving control and data signals from said microprocessor means and said data cache means, for storing data to and reading data from said at least one entry;

wherein data in said entry is used to make said page fault determination before said data cache means is accessed.

24. A microprocessor based computer system as set forth in claim 23 wherein said microprocessor means generates a store operation signal and a virtual address indicating where data are to be stored in memory and wherein:

said memory control means, in response to a store operation signal, compares at least one portion of said virtual address with the contents of at least one said entry of said secondary memory to determine if said at least one virtual address portion matches the contents of said at least one entry of said secondary memory.

25. A microprocessor based computer system as set forth in claim 24 wherein:

said memory control means generates an accelerate issue signal in response to the result of said comparison indicating a match of said at least one virtual address portion and said at least one entry.

26. A microprocessor based computer system as set forth in claim 24 wherein said data cache means includes associative means for determining whether a block of virtual addresses is resident in said primary memory and for generating a match signal in response to the determination indicating a virtual to real address translation is possible for said data cache and wherein:

said memory control means generates said accelerate issue signal in response to said match signal transferred to said microprocessor means via said data bus.

27. A microprocessor based computer system as set forth in claim 24 wherein:

said memory control means clears said at least one entry of said memory in response to said page fault signal.

28. A microprocessor based computer system as set forth in claim 23 wherein:

the number of said at least one entry is less than or equal to the number of page frames contained in said primary memory.

29. A microprocessor based computer system as set forth in claim 24 wherein:

the number of bits of said entry is equal to the number of bits of said portions of said virtual address indicating which blocks of data are stored in said primary memory.

30. A microprocessor based computer system as set forth in claim 24 wherein:

said secondary memory is an associative memory and said comparison is accomplished associatively.

* * * * *